United States Patent
Denda et al.

(10) Patent No.: US 9,512,320 B2
(45) Date of Patent: *Dec. 6, 2016

(54) BASE METAL PIGMENT, AQUEOUS BASE METAL PIGMENT DISPERSION LIQUID, AND AQUEOUS INK COMPOSITION

(71) Applicant: Seiko Epson Corporation, Tokyo (JP)

(72) Inventors: Atsushi Denda, Chino (JP); Masaru Terada, Suwa (JP); Hiroshi Takiguchi, Matsumoto (JP); Tomohiro Ogawa, Shiojiri (JP); Naoyuki Toyoda, Suwa (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/603,918

(22) Filed: Jan. 23, 2015

(65) Prior Publication Data

US 2015/0210859 A1    Jul. 30, 2015

(30) Foreign Application Priority Data

Jan. 27, 2014    (JP) ................. 2014-012381

(51) Int. Cl.
C09D 11/322    (2014.01)
C09C 1/64    (2006.01)

(52) U.S. Cl.
CPC ............. *C09C 1/644* (2013.01); *C09D 11/322* (2013.01); *C01P 2004/20* (2013.01); *C01P 2006/40* (2013.01); *C01P 2006/90* (2013.01)

(58) Field of Classification Search
CPC .... C09D 11/322; C09C 1/644; C01P 2004/20; C01P 2006/40; C01P 2006/90
See application file for complete search history.

(56) References Cited

U.S. PATENT DOCUMENTS

| 5,637,143 A | 6/1997 | Jenkins et al. |
| 6,281,277 B1 * | 8/2001 | Ishii ................. B82Y 30/00 |
| | | 423/111 |
| 2003/0029355 A1 | 2/2003 | Miyabayashi |
| 2007/0028807 A1 | 2/2007 | Wallquist et al. |
| 2008/0081864 A1 | 4/2008 | Takano |
| 2008/0250970 A1 | 10/2008 | Oyanagi et al. |
| 2008/0314284 A1 | 12/2008 | Li et al. |
| 2010/0326323 A1 | 12/2010 | Abe et al. |
| 2011/0008613 A1 | 1/2011 | Takano et al. |
| 2011/0110992 A1 | 5/2011 | Garrison et al. |
| 2015/0112003 A1 | 4/2015 | Toyoda et al. |

FOREIGN PATENT DOCUMENTS

| JP | 2759198 B2 | 5/1998 |
| JP | 2003213157 A * | 7/2003 |

(Continued)

OTHER PUBLICATIONS

Machine translation of JP 2003-213157.*

*Primary Examiner* — Veronica F Faison
(74) *Attorney, Agent, or Firm* — Harness, Dickey & Pierce, P.L.C.

(57) ABSTRACT

Disclosed herein is a base metal pigment, which is used for an aqueous ink composition containing water as a part of a solvent, in which the base metal pigment is surface-treated with a fluorine-based compound, and has a zeta potential of greater than or equal to −50 mV and less than or equal to −15 mV, as measured by an ultrasonic zeta potential measurement device, in a pH range of greater than or equal to 5 and less than or equal to 10.

10 Claims, 1 Drawing Sheet

FOREIGN PATENT DOCUMENTS

| | | |
|---|---|---|
| JP | 2006-169393 A | 6/2006 |
| JP | 2006-199920 A | 8/2006 |
| JP | 3869503 B2 | 1/2007 |
| JP | 2008-174712 A | 7/2008 |
| JP | 2009-215411 A | 9/2009 |
| JP | 4358897 B1 | 11/2009 |
| JP | 2012-251070 A | 12/2012 |
| JP | 2013-122008 A | 6/2013 |
| WO | WO-95-04783 A1 | 2/1995 |
| WO | WO-2006-066825 A2 | 6/2006 |

* cited by examiner

FIGURE
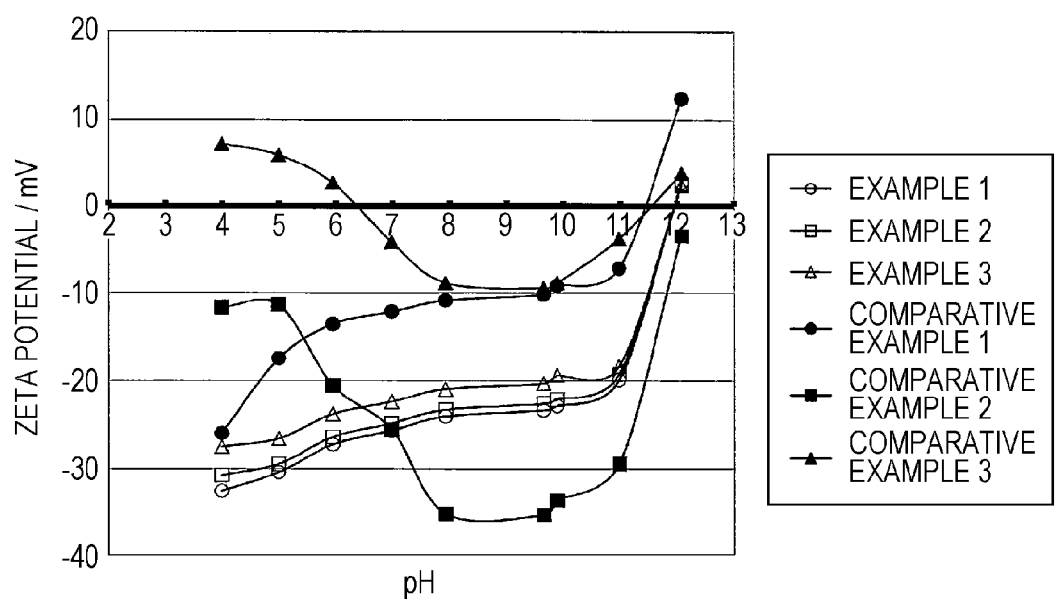

BASE METAL PIGMENT, AQUEOUS BASE METAL PIGMENT DISPERSION LIQUID, AND AQUEOUS INK COMPOSITION

BACKGROUND

1. Technical Field

The present invention relates to a base metal pigment having excellent water resistance and dispersion stability in an aqueous medium, an aqueous base metal pigment dispersion liquid containing the base metal pigment, and an aqueous ink composition containing the base metal pigment.

2. Related Art

In the related art, as methods of forming a coating film having metallic luster on a printed matter, a foil press printing method using a printing ink or metal foil, in which gold powder or silver powder made of brass, aluminum microparticles, or the like is used in a pigment, a thermal transfer printing method using a metal foil, and the like have been used. However, these methods are problematic in that it is difficult to form a fine pattern or to apply these methods to a curved surface. Particularly, the foil press printing method is problematic in that on-demand properties are low, the application thereof to multi-product production is difficult, and the printing of a gradational metal tone is impossible.

Recently, a large number of application examples of an ink jet head in printing have been found. One of the application examples is metallic printing, and thus the development of an ink having metallic luster has been conducted. An ink jet method is advantageous in that it can be suitably applied to the formation of a fine pattern or the recording onto a curved surface. For example, JP-A-2008-174712 discloses an aluminum pigment dispersion liquid based on an organic solvent such as alkylene glycol, and a non-aqueous ink composition containing the same.

Meanwhile, in terms of global environment and human safety, there is a tendency that the development of an aqueous ink composition instead of a non-aqueous ink composition based on an organic solvent is desired. However, when an aluminum pigment, as a kind of base metal pigment, is dispersed in water, alumina is formed together with the generation of hydrogen gas by the reaction with water to cause a whitening phenomenon. For this reason, the aluminum pigment loses metallic luster.

In order to solve the above problems, for example, Japanese Patent No. 4358897 discloses a surface-coated aluminum pigment in which water resistance is provided by surface-treating an aluminum pigment with alkoxysilane. Japanese Patent No. 3869503 discloses a composition containing aluminum powder, inorganic phosphoric acid (salt), phosphate ester, and water. Japanese Patent No. 2759198 discloses an aqueous paint composition containing aluminum coated with a hetero-polyanion compound. JP-A-2006-199920 discloses an aluminum pigment, which is prepared by treating aluminum with a phosphate compound or a borate compound and then coating the treated aluminum with a layer containing hydrated tin oxide or the like.

However, the aluminum pigment disclosed in each of the above Japanese Patent No. 4358897, Japanese Patent No. 3869503, Japanese Patent No. 2759198, and JP-A-2006-199920 is problematic in that water resistance is insufficient, and in that surface state is changed by the oxidation proceeding over time in an aqueous medium, and thus dispersion stability deteriorates. In addition, when the surface of aluminum is coated, there is a problem in that the oxidation of aluminum proceeds during the surface coating, and thus agglomeration easily occurs together with the deterioration of luster.

SUMMARY

An advantage of some aspects of the invention is to provide a base metal pigment having excellent water resistance and dispersion stability in an aqueous medium, an aqueous base metal pigment dispersion liquid containing the base metal pigment, and an aqueous ink composition containing the base metal pigment.

The invention can be realized in the following forms or application examples.

Application Example 1

According to an aspect of the invention, there is provided a base metal pigment, which is used for an aqueous ink composition containing water as a part of a solvent, in which the base metal pigment is surface-treated with a fluorine-based compound, and has a zeta potential of greater than or equal to −50 mV and less than or equal to −15 mV, as measured by an ultrasonic zeta potential measurement device, in a pH range of greater than or equal to 5 and less than or equal to 10.

According to the base metal pigment of Application Example 1, when this base metal pigment is combined with an aqueous ink composition containing water as a part of a solvent, water resistance and dispersion stability are good. Further, since the zeta potential of the base metal pigment of Application Example 1 in a wide pH range has a negative value, which is steady, it is possible to prevent problems, such as poor discharge due to agglomeration near a head nozzle hole, poor capping due to the agglomeration and precipitation of residues, gelation in the passage of waste liquid, accumulation of precipitates in a waste liquid bottle, and the like, even when this base metal pigment is mixed with a different aqueous ink in a head cap or a waste liquid tank.

Application Example 2

In the base metal pigment of Application Example 1, the difference between the maximum value and minimum value of the zeta potential in a pH range of greater than or equal to 5 and less than or equal to 10 may be less than or equal to 15 mV.

According to the base metal pigment of Application Example 2, the value of the zeta potential in a wide pH range is further steady, and thus dispersion stability becomes better. In addition, the above-mentioned problems can be prevented more effectively.

Application Example 3

In the base metal pigment of Application Example 1 or Application Example 2, the base metal pigment may have a scale-like shape.

According to the base metal pigment of Application Example 3, the base metal pigment can exhibit its own metallic luster more effectively.

Application Example 4

In the base metal pigment of any one of Application Examples 1 to 3, the fluorine-based compound may have a perfluoroalkyl group.

Application Example 5

In the base metal pigment of Application Example 4, the perfluoroalkyl group may have a carbon number of 1 to 6.

According to the base metal pigment of Application Example 4 or Application Example 5, the fluorine-based compound has such a structure, thereby further improving the water resistance and dispersion stability of the base metal pigment.

Application Example 6

In the base metal pigment of any one of Application Examples 1 to 5, heat treatment may be performed when the base metal pigment is surface-treated with the fluorine-based compound.

According to the base metal pigment of Application Example 6, the fluorine-based compound physically adsorbed on the surface of the base metal pigment can be covalently bonded to the surface thereof, and thereby this fluorine-based compound is strongly bonded to the surface thereof. As a result, the water resistance of the base metal pigment can be further improved, and simultaneously the dispersion stability thereof can become better because the value of the zeta potential is steady.

Application Example 7

According to another aspect of the invention, there is provided an aqueous base metal pigment dispersion liquid, including: a base metal pigment surface-treated with a fluorine-based compound; and water as a part of a solvent, in which the aqueous base metal pigment dispersion liquid has a zeta potential of greater than or equal to −50 mV and less than or equal to −15 mV, as measured by an ultrasonic zeta potential measurement device, in a pH range of greater than or equal to 5 and less than or equal to 10.

According to the aqueous base metal pigment dispersion liquid of Application Example 7, the water resistance and dispersion stability of the base metal pigment becomes better.

Application Example 8

In the aqueous base metal pigment dispersion liquid of Application Example 7, a solvent, from which the base metal pigment was removed by centrifugal separation, may have a specific dielectric constant of greater than or equal to 45 and less than or equal to 60, as measured by an alternate current-type dielectric constant measurement device, at a temperature of 23° C. and a frequency of 10 kHz.

According to the aqueous base metal pigment dispersion liquid of Application Example 8, an aqueous medium having a predetermined specific dielectric constant is used as a dispersion medium, and thereby the water resistance and dispersion stability of the base metal pigment surface-treated with the fluorine-based compound become better.

Application Example 9

According to still another aspect of the invention, there is provided an aqueous ink composition, including: a base metal pigment surface-treated with a fluorine-based compound; and water as a part of a solvent, in which the aqueous ink composition has a zeta potential of greater than or equal to −50 mV and less than or equal to −15 mV, as measured by an ultrasonic zeta potential measurement device, in a pH range of greater than or equal to 5 and less than or equal to 10.

According to the aqueous ink composition of Application Example 9, the water resistance and dispersion stability of the base metal pigment become better. Further, according to the aqueous ink composition of Application Example 9, since the zeta potential of the aqueous ink composition in a wide pH range is a negative value, which is steady, it is possible to prevent problems, such as poor discharge due to agglomeration near a head nozzle hole, poor capping due to the agglomeration and precipitation of residues, gelation in the passage of waste liquid, accumulation of precipitate in a waste liquid bottle, and the like, even when this aqueous ink composition is mixed with a different aqueous ink in a head cap or a waste liquid tank.

Application Example 10

In the aqueous ink composition of Application Example 9, a solvent, from which the base metal pigment was removed by centrifugal separation, may have a specific dielectric constant of greater than or equal to 45 and less than or equal to 60, as measured by an alternate current-type dielectric constant measurement device, at a temperature of 23° C. and a frequency of 10 kHz.

According to the aqueous ink composition of Application Example 10, an aqueous medium having a predetermined specific dielectric constant is used, and thereby the water resistance and dispersion stability of the base metal pigment surface-treated with the fluorine-based compound become better.

BRIEF DESCRIPTION OF THE DRAWING

The invention will be described with reference to the accompanying drawing, wherein like numbers reference like elements.

FIGURE is a graph showing the relationship between pH and zeta potential according to Examples and Comparative Examples.

DESCRIPTION OF EXEMPLARY EMBODIMENTS

Hereinafter, a preferable embodiment of the invention will be described. The following embodiment describes an example of the invention. The invention is not limited to the following embodiments. Various modifications can be made within the scope not departing from the gist thereof.

Hereinafter, a base metal pigment, an aqueous base metal pigment dispersion liquid, and an aqueous ink composition will be described in this order.

1. Base Metal Pigment

The base metal pigment according to the present embodiment is a base metal pigment for an aqueous ink composition containing water as a part of a solvent. Here, this base metal pigment is surface-treated with a fluorine-based compound, and has a zeta potential of greater than or equal to −50 mV and less than or equal to −15 mV, as measured by an ultrasonic zeta potential measurement device, in a pH range of greater than or equal to 5 and less than or equal to 10.

In the invention, the term "base metal" is referred to as a metal having a greater ionization tendency than hydrogen. Examples of the base metal include alkali metals, alkaline-earth metals, single metals such as Al, Fe, Zn, Pb, Cu, Ni, Co, and Cr, and alloys thereof.

In the base metal pigment according to the present embodiment, pigment particles made of a base metal-containing material (hereinafter, the pigment particle made of a base metal-containing material before surface treatment is referred to as "mother particle") are surface-treated with a fluorine-based compound. That is, the base metal pigment according to the present embodiment has a structure in which the surface of pigment particles (mother particles)

made of a base metal-containing material is coated with a monolayer or multilayer containing a fluorine-based compound.

1.1. Mother Particle

First, the pigment particle (mother particle) made of a base metal-containing material is described. The mother particles may be partially (a region including at least a surface periphery) made of a base metal, or may also be entirely made of a base metal. Further, the mother particle may include a base made of a non-metallic material and a base metal-made coating layer covering the base.

The base metal constituting the mother particle is not limited as long as it fits the definition of the above-mentioned base metal, but, in terms of securement of metallic luster and in terms of cost, base metals including at least one of Al, Fe, Cu, Ni, and Cr, or alloys of these base metals and other metals are preferable, and Al or an Al alloy is more preferable. When Al or an Al alloy is dispersed in an aqueous medium, hydrogen gas is generated by a reaction with water, and simultaneously $Al(OH)_3$ or $Al_2O_3$ is formed, thereby causing a whitening phenomenon. Due to this reaction, there is a problem that Al or an AL alloy loses metallic luster. In the invention, a base metal pigment coated with a monolayer or multilayer containing a fluorine-based compound is used, thereby providing water resistance, so as to prevent the occurrence of the above problem.

Further, the mother particle may be formed by any method. However, for example, preferably, the mother particle is a scale-like particle obtained by forming a base metal film on one side of a sheet-like substrate using an evaporation method, stripping the base metal film from the sheet-like substrate, and then pulverizing the stripped base metal film. Instead of the evaporation method, ion plating or sputtering may be used. According to this method, a scale-like mother particle having small film thickness variation and high surface flatness can be obtained, and thus the mother particle obtained in this way can exhibit its own metallic luster more effectively.

As the sheet-like substrate, for example, a plastic film, such as polyethylene terephthalate, may be used. Further, on the film forming surface of the sheet-like substrate, a stripping agent for improving strippability, such as silicone oil, may be applied previously, and a resin layer for stripping may also be formed previously. Examples of resins used in the resin layer for stripping include polyvinyl alcohol, polyvinyl butyral, polyethylene glycol, polyacrylic acid, polyacrylamide, cellulose acetate butyrate as a cellulose derivative, and a modified nylon resin. The stripping and pulverization of the base metal film may be performed by irradiating the film with ultrasonic waves in a non-aqueous medium or by applying external force to the film with the stirring using a homogenizer.

When the stripping and pulverization of the base metal film may be performed in this way, preferable examples of the non-aqueous medium used herein may include alcohols, such as methanol, ethanol, propanol, and butanol; hydrocarbon compounds, such as n-heptane, n-octane, decane, dodecane, tetradecane, toluene, xylene, cymene, durene, indene, dipentene, tetrahydronaphthalene, decahydronaphthalene, and cyclohexylbenzene; ether compounds, such as ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, diethylene glycol monobutyl ether acetate, diethylene glycol n-butyl ether, tripropylene glycol dimethyl ether, triethylene glycol diethyl ether, propylene glycol monomethyl ether acetate, 1,2-dimethoxyethane, bis(2-methoxyethyl) ether, and p-dioxane; and polar organic solvents, such as propylene carbonate, γ-butyrolactone, N-methyl-2-pyrrolidone, N,N-dimethylformamide, N,N-dimethylacetamide, dimethyl sulfoxide, cyclohexanone, and acetonitrile. When this non-aqueous medium is used, the variations in size, shape, and characteristics among particles can be reduced, while preventing the involuntary oxidation of the mother particles.

Meanwhile, the preferable average particle diameter and average thickness of the mother particles are approximately equal to the average particle diameter and average thickness of the following base metal pigment, and therefore, a description thereof will be omitted.

1.2. Fluorine-Based Compound

Subsequently, a fluorine-based compound used in the surface treatment of mother particles is described. As described above, the base metal pigment according to the present embodiment is a base metal pigment in which the mother particles are surface-treated with the fluorine-based compound. As the fluorine-based compound, fluorine-based phosphonic acid, fluorine-based carboxylic acid, fluorine-based sulfonic acid, and salts thereof may be preferably used. When these fluorine-based compounds are used, a phosphate group, a carboxyl group, or a sulfonate group is bonded to the surface of the mother particles to form a coated film, thus obtaining a base metal pigment having water resistance. Therefore, it is possible to effectively prevent the base metal pigment from reacting with water in an aqueous medium. Further, the base metal pigment shows steady negative zeta potential in a wide pH range, thus obtaining an aqueous base metal pigment dispersion liquid or aqueous ink composition excellent in dispersion stability. Among these, since the bonding ability of the phosphate group to the surface of the mother particle is very excellent, fluorine-based phosphonic acid and a salt thereof are more preferable.

Preferably, the fluorine-based phosphonic acid and salt thereof have a structure represented by the following General Formula (1).

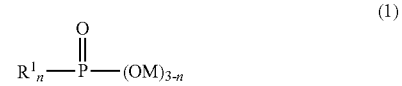

(1)

In the Formula (1) above, $R^1$ is each independently one group selected from the following structural formulae, and M is each independently a hydrogen atom, a monovalent metal ion, an ammonium ion, or $-NR^2R^3R^4$. $R^2$, $R^3$, and $R^4$ are each independently a hydrogen atom or a $C_2H_4OH$ group, except that all of them are hydrogen atoms. n is an integer of greater than or equal to 1 and less than or equal to 3, m is an integer of greater than or equal to 1 and less than or equal to 12, and l is an integer of greater than or equal to 1 and less than or equal to 12.

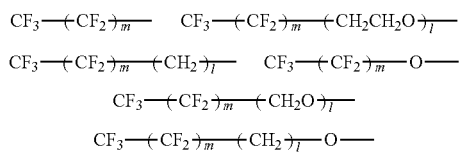

In the Formula (1) above, m is an integer of greater than or equal to 1 and less than or equal to 12, but preferably greater than or equal to 1 and less than or equal to 8, and more preferably greater than or equal to 1 and less than or equal to 5. Further, l is an integer of greater than or equal to 1 and less than or equal to 12, but preferably greater than or equal to 1 and less than or equal to 10, and more preferably greater than or equal 1 and less than or equal to 6. When m and l are respectively within the above preferable ranges, the above-mentioned effects are remarkably exhibited.

Preferably, the fluorine-based phosphonic acid is a compound represented by the following General Formula (2) in terms of being excellent in the balance between absorption capacity onto the surface of the mother particle and the improvement of water resistance.

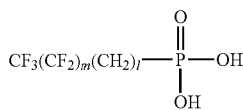

(2)

In the Formula (2) above, m is an integer of greater than or equal to 1 and less than or equal to 12, but preferably greater than or equal to 1 and less than or equal to 8, and more preferably greater than or equal to 1 and less than or equal to 5. Further, l is an integer of greater than or equal to 1 and less than or equal to 12, but preferably greater than or equal to 1 and less than or equal to 10, and more preferably greater than or equal to 1 and less than or equal to 6. When m and l are respectively within the above preferable ranges, the above-mentioned effects are remarkably exhibited.

Preferably, the fluorine-based carboxylic acid and salt thereof have a structure represented by the following General Formula (3).

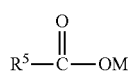

(3)

In the Formula (3) above, $R^5$ is one group selected from the following structural formulae, and M is a hydrogen atom, a monovalent metal ion, or ammonium ion. m is an integer of greater than or equal to 1 and less than or equal to 12, but preferably greater than or equal to 1 and less than or equal to 8, and more preferably greater than or equal to 1 and less than or equal to 5. Further, l is an integer of greater than or equal to 1 and less than or equal to 12, but preferably greater than or equal to 1 and less than or equal to 10, and more preferably greater than or equal to 1 and less than or equal to 6.

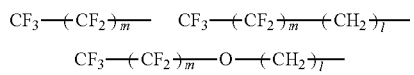

Preferably, the fluorine-based sulfonic acid and salt thereof have a structure represented by the following General Formula (4).

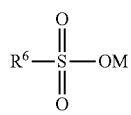

(4)

In the Formula (4) above, $R^6$ is one group selected from the following structural formulae, and M is a hydrogen atom, a monovalent metal ion, or ammonium ion. m is an integer of greater than or equal to 5 and less than or equal to 17, and l is an integer of greater than or equal to 1 and less than or equal to 12.

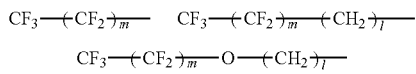

In addition, preferably, the fluorine-based compound has a perfluoroalkyl group ($C_nF_{2n+1}$—) on at least part of the structure thereof, and more preferably, the perfluoroalkyl group has a carbon number of 1 to 6. When the fluorine-based compound has such a structure, a base metal pigment having further improved water resistance and excellent metallic luster and dispersion stability can be easily obtained.

Moreover, it is preferable that the molecular weight of the fluorine-based compound be less than or equal to 1000. When the fluorine-based compound adsorbed on the surface of the mother particles is a fluorine-based polymer disclosed in JP-A-2003-213157, JP-A-2006-169393, or JP-A-2009-215411, a coated film becomes excessively thick, so that metallic luster deteriorates and the interaction between base metal pigment particles provided with the coated film becomes strong, thereby remarkably deteriorating dispersion stability in some cases. For this reason, it is preferable that the film formed on the surface of the mother particles be a monomolecular film made of the fluorine-based compound having a molecular weight of less than or equal to 1000.

1.3. Zeta Potential

The base metal pigment according to the present embodiment is characterized in that the zeta potential thereof measured by an ultrasonic zeta potential measurement device is greater than or equal to −50 mV and less than or equal to −15 mV in a pH range of greater than or equal to 5 and less than or equal to 10. In the case where the zeta potential thereof in a pH range of greater than or equal to 5 and less than or equal to 10 is within the above range, water resistance and dispersion stability become better when this base metal pigment is combined with an aqueous dispersion liquid or aqueous ink composition containing water as a part of a solvent. Further, since the zeta potential of this base metal pigment in the wide pH range is a negative value, which is steady, it is possible to prevent problems, such as poor discharge due to agglomeration near a head nozzle hole, poor capping due to the agglomeration and precipitation of residues, gelation in the passage of waste liquid, accumulation of precipitate in a waste liquid bottle, and the like, even when this base metal pigment is mixed with a different aqueous ink in a head cap or a waste liquid tank. Meanwhile, when the pH is more than 10, it is difficult to control the proceeding of corrosion even in the case of the base metal pigment obtained by surface-treating the mother particle with the fluorine-based compound. Therefore, it is preferable that the base metal pigment according to the present embodiment not be used in the pH range of more than 10.

Here, the zeta potential is a value measured by an ultrasonic zeta potential measurement device. Hereinafter, the measurement principle of the ultrasonic zeta potential measurement device is briefly described. The ultrasonic zeta potential measurement device uses an ultrasonic vibration current method as a measurement principle. That is, when a particle dispersion liquid is irradiated with ultrasonic waves, particles are relatively vibrated by the density difference between particles and a solvent. As a result, polarization of electrically-charged particles and counter ions thereabound occurs, and an electric field, referred to as colloid vibration potential (CVP), is generated. This electric field causes the potential change of the surface of an electrode provided in a solution, and is thus detected as electric current. This electric current is referred to as colloid vibration current (CVI). The zeta potential can be obtained from colloid vibration current (CVI) by the following Formula (5).

$$CVI = \frac{3\varepsilon\varepsilon_0 \zeta (1-\phi)\phi}{2\eta(1+0.5\phi)} \cdot \frac{\rho_P - \rho_S}{\rho_S} \cdot G(a, \phi) \cdot P \qquad (5)$$

In the symbols in the Formula (5) above, $\varepsilon$ indicates dielectric constant of solvent, $\varepsilon_0$ indicates dielectric constant in vacuum, $\zeta$ indicates zeta potential, $\eta$ indicates viscosity of solvent, $\phi$ indicates volume concentration of particle, $\rho_p$ indicates density of particle, $\rho_s$ indicates density of dispersion system, P indicates sound pressure, and $G(a,\phi)$ indicates hydrodynamic interparticle interaction correction factor (depending on particle diameter $a,\phi$), respectively. According to this ultrasonic vibration current method, the zeta potential can be measured even if a dispersion medium for dispersing particles is any one of an aqueous medium and a non-aqueous medium. Further, a crude liquid can be directly measured without diluting a particle dispersion liquid as in electrophoretic light scattering.

The base metal pigment according to the present embodiment may have a zeta potential of greater than or equal to −50 mV and less than or equal to −15 mV, more preferably greater than or equal to −40 mV and less than or equal to −17 mV, and particularly preferably greater than or equal to −33 mV and less than or equal to −18 mV, as measured by an ultrasonic zeta potential measurement device, in a pH range of greater than or equal to 5 and less than or equal to 10.

Further, in the base metal pigment according to the present embodiment, it is preferable that the difference between the maximum value and minimum value of the zeta potential, measured by an ultrasonic zeta potential measurement device, in a pH range of greater than or equal to 5 and less than or equal to 10 be less than or equal to 15 mV. In this case, the value of the zeta potential in a pH range of greater than or equal to 5 and less than or equal to 10 becomes more steady, and thus the dispersion stability of the base metal pigment becomes better. In addition, the above-mentioned problem occurring when this base metal pigment is mixed with another aqueous ink in a head cap or a waste liquid tank can be more effectively prevented.

1.4. Method of Preparing Base Metal Pigment

The base metal pigment according to the present embodiment can be prepared as follows.

First, a dispersion liquid, in which the above-mentioned mother particles are dispersed in a non-aqueous medium, is prepared. This dispersion liquid, if needed, is diluted with the same or different non-aqueous medium, and then the mother particles are pulverized by a stirrer such as a homogenizer or by ultrasonic irradiation such that the average particle diameter of the mother particles is less than or equal to 3 μm. The pulverization time is not particularly limited, but is generally 3 hours to 24 hours. Further, as the non-aqueous medium used in dilution, the same non-aqueous medium as the above-mentioned non-aqueous medium used in stripping and pulverizing is exemplified.

Subsequently, the above-mentioned fluorine-based compound is added to the dispersion liquid, in which the pulverized mother particles are dispersed in a non-aqueous medium, and then this dispersion liquid added with the fluorine-based compound is irradiated with ultrasonic waves to form a fluorine-based compound-coated film on the surface of the mother particles. In this way, a base metal pigment, in which the surface of the mother particles is treated with the fluorine-based compound, is obtained. The addition amount of the fluorine-based compound is 1 part by mass to 70 parts by mass, preferably 5 parts by mass to 40 parts by mass, and more preferably 15 parts by mass to 30 parts by mass, based on 100 parts by mass of the mother particle. Further, when surface treatment is conducted by ultrasonic irradiation, heating may be conducted. It is preferable that the heating temperature be higher than or equal to 40° C. Accordingly, it is presumed that the fluorine-based compound physically adsorbed on the surface of the mother particle is dehydrated by heating to form covalent bonds, thereby more strongly bonding the mother particle and the fluorine-based compound.

The surface treatment of the mother particle using the fluorine-based compound may be performed by directly treating the surface of the mother particle with the fluorine-based compound, but may also be performed by surface-treating the mother particle pretreated with acid or base using the fluorine-based compound. In this case, the chemical modification can be more definitely performed on the surface of the mother particle by the fluorine-based compound, and the above-mentioned effects of the invention can be more effectively realized. In addition, even when an oxide film is formed on the surface of particles to be the mother particles before the surface treatment of the mother particle using the fluorine-based compound, this oxide film can be removed, and the surface treatment of the mother particle using the fluorine-based compound can be performed in the state where the oxide film is removed, and thus the metallic luster of the manufactured base metal pigment can become more excellent. Examples of the acid used herein may include protonic acids, such as hydrochloric acid, sulfuric acid, phosphoric acid, nitric acid, boric acid, acetic acid, carbonic acid, formic acid, benzoic acid, chlorous acid, hypochlorous acid, sulfurous acid, hyposulfurous acid, nitrous acid, hyponitrous acid, phosphorous acid, and hypophosphorous acid. Meanwhile, Examples of the base used herein may include sodium hydroxide, potassium hydroxide, and calcium hydroxide.

Subsequently, solvent substitution is performed. Specifically, a dispersion liquid, in which a base metal pigment is dispersed in a non-aqueous medium, is centrifugally separated to remove a supernatant liquid, the following aqueous medium previously prepared by mixing is added to this dispersion liquid in an adequate amount, and then the resulting dispersion liquid is irradiated with ultrasonic waves, thereby dispersing the base metal pigment in the aqueous medium. By the above process, the base metal pigment (aqueous base metal pigment dispersion liquid) according to the present embodiment is obtained. In addition, the base metal pigment obtained in this way is also preferably heated. It is predicted that the fluorine-based compound physically adsorbed on the surface of the mother particles is dehydrated by heating to form covalent bonds, and thus the mother particle and the fluorine-based compound are more strongly bonded to each other, thereby more effectively exhibiting the above-mentioned effects of the invention. The heating temperature is preferably higher than or equal to 50° C., and more preferably higher than or equal to 60° C. The heating time is preferably 1 day to 10 days. Further, it is preferred that the heat-treated base metal pigment be washed with an aqueous medium. Therefore, the fluorine-based compound, which is physically adsorbed on the surface of the base metal pigment so as to be easily detached therefrom, can be removed, and the unnecessary fluorine-based compound can be removed from the aqueous medium, thereby further improving the dispersion stability of the base metal pigment in the aqueous medium. In terms of increasing detergency, a solvent (for example, 2-methyl-2,4-pentanediol) having an ability of dissolving the fluorine-based compound or the following fluorine-based surfactant may be added to the aqueous medium used in the washing.

The above-mentioned aqueous medium may be a medium containing water as a main component, and may also be added with an organic solvent, a surfactant, a tertiary amine, a pH adjuster, or the like. The content ratio of water in the aqueous medium is preferably more than or equal to 20 mass %, more preferably more than or equal to 30 mass %, and particularly preferably more than or equal to 45 mass %.

Preferably, the organic solvent that can be added to the aqueous medium is a polar organic solvent, in terms of compatibility with water. Examples of the polar organic solvent include alcohols (methyl alcohol, ethyl alcohol, propyl alcohol, butyl alcohol, isopropyl alcohol, fluorinated alcohol, and the like); ketones (acetone, methyl ethyl ketone, cyclohexanone, and the like); carboxylic acid esters (methyl acetate, ethyl acetate, propyl acetate, butyl acetate, methyl propionate, ethyl propionate, and the like); ethers (diethyl ether, dipropyl ether, tetrahydrofuran, dioxane, and the like); polyhydric alcohols (ethylene glycol, diethylene glycol, triethylene glycol, polyethylene glycol, polypropylene glycol, propylene glycol, butylene glycol, 1,2,6-hexanetriol, thioglycol, hexylene glycol, 1,2-hexanediol, glycerin, trimethylol ethane, trimethylol propane, and the like); lactams (2-pyrrolidone, and the like); and glycol ether solvents (alkylene glycol monoethers such as triethylene glycol monobutyl ether, alkylene glycol diethers such as diethylene glycol diethyl ether, and the like). The content ratio of the organic solvent in the aqueous medium is preferably less than or equal to 60 mass %, and more preferably 35 mass % to 55 mass %. When the content ratio of the organic solvent is within the above range, the water resistance of the base metal pigment is improved, and simultaneously the metallic luster thereof becomes better.

Preferably, the surfactant that can be added to the aqueous medium is a fluorine-based surfactant and/or a silicone-based surfactant. The content ratio of the surfactant in the aqueous medium is preferably less than or equal to 3 mass %, more preferably 0.01 mass % to 2 mass %, and particularly preferably 0.1 mass % to 1 mass %. When the content ratio of the surfactant is within the above range, the water resistance of the base metal pigment tends to be more improved. In addition, at the time of recording a metallic luster image, the surfactant functions as a slip agent, and is effective at improving the friction resistance of an image.

Examples of the fluorine-based surfactant include Megafac F-430, Megafac F-444, Megafac F-472SF, Megafac F-475, Megafac F-477, Megafac F-552, Megafac F-553, Megafac F-554, Megafac F-555, Megafac F-556, Megafac F-558, Megafac R-94, Megafac RS-75, and Megafac RS-72-K (all are trade names, manufactured by DIC Corporation); EFTOP EF-351, EFTOP EF-352, EFTOP EF-601, EFTOP EF-801, and EFTOP EF-802 (all are trade names, manufactured by Mitsubishi Materials Corporation); FTERGENT 222F, FTERGENT 251 and FTX-218 (all are trade names, manufactured by Neos Co., Ltd.); and Surflon SC-101 and Surflon KH-40 (all are trade names, manufactured by AGC Seimi Chemical Co., Ltd.).

Examples of the silicone-based surfactant include BYK-300, BYK-306, BYK-310, BYK-320, BYK-330, BYK-344, BYK-346, BYK-UV3500, and BYK-UV3570 (all are trade names, manufactured by BYK Japan K.K.); and KP-341, KP-358, KP-368, KF-96-50CS, and KF-50-100CS (all are trade names, manufactured by Shin-Etsu Chemical Co., Ltd.).

Examples of the tertiary amine that can be added to the aqueous medium include hydroxylamines, such as triethanolamine, tripropanolamine, tributanolamine, N, N-dimethyl-2-aminoethanol, and N,N-diethyl-2-aminoethanol.

It is preferred that the pH adjuster that can be added to the aqueous medium have a buffering action capable of adjusting pH in a range of 5 to 10. In the base metal pigment according to the present embodiment, the zeta potential of the base metal pigment (particularly, aluminum and an aluminum alloy) in a pH range of 5 to 10 becomes negative, and thus the dispersion stability of the base metal pigment is improved by the electrostatic repulsion between the base metal pigment particles. Examples of the pH adjuster having a buffering action include good buffers, such as 4-(2-hydroxyethyl)-1-piperazineethane sulfonic acid (HEPES), morpholinoethane sulfonic acid (MES), carbamoylmethyl-iminobis acetic acid (ADA), piperazine-1,4-bis(2-ethanesulfonic acid) (PIPES), N-(2-acetamido)-2-aminoethane sulfonic acid (ACES), colamine hydrochloride, N,N-bis(2-hydroxyethyl)-2-aminoethane sulfonic acid (BES), N-tris(hydroxymethyl)methyl-2-aminoethane sulfonic acid (TES), acetamide glycine, tricine, glycine amide, and bicine; a phosphate buffer; and a tris-buffer.

Moreover, when the base metal pigment is removed from the aqueous pigment, the specific dielectric constant of the aqueous medium, as measured by an alternate current-type dielectric constant measurement device at a temperature of 23° C. and a frequency of 10 kHz is preferably greater than or equal to 45 and less than or equal to 60, and more preferably greater than or equal to 50 and less than or equal to 58. When the aqueous medium having a specific dielectric constant within the above range is used, the water resistance and dispersion stability of the base metal pigment surface-treated with the fluorine-based compound become better.

In the invention, the specific dielectric constant may be measured at 23° C. by a parallel-plate capacitor method using an alternate current-type dielectric constant measurement device. Specifically, under an environment of 23° C., a sample is pinched between two parallelly-arranged electrode plates (gap between electrode plates: 0.5 mm) to form a capacitor. Subsequently, an alternate current of 1 V is applied to the capacitor at a frequency of 10 kHz to 100 kHz, and the specific dielectric constant thereof is measured. In this case, the specific dielectric constant measured when the alternate current was applied at a frequency of 10 kHz is set as "specific dielectric constant" in the invention.

1.5. Physical Properties of Base Metal Pigment

1.5.1. Shape

The base metal pigment according to the present embodiment may have any shape, such as a sphere, a spindle, a needle, or the like, but, preferably, has a scale-like shape. When the base metal pigment has a scale-like shape, light reflectivity becomes better, and thus it is possible to record an image having excellent metallic luster.

In the invention, the scale-like shape, like a flat plate, a curved plate, or the like, is referred to as a shape whose area observed at a predetermined angle (observed by planar view) is larger than the area observed at an angle perpendicular to this observation direction. Particularly, the ratio $(S_1/S_0)$ of area $S_1[\mu m^2]$ observed from a direction in which a projected area is the largest (observed by planar view) to area $S_0[\mu m^2]$ observed from a direction in which an area observed from directions perpendicular to the observation direction is the largest is preferably greater than or equal to 2, more preferably greater than or equal to 5, and particularly preferably greater than or equal to 8. As this value, an average value of values obtained by observing arbitrary ten particles and calculating the area ratios of these particles may be employed.

1.5.2. Average Particle Diameter and Average Thickness

In the base metal pigment according to the present embodiment, the average particle diameter thereof is preferably 0.25 µm to 3 µm, more preferably 0.25 µm to 1.5 µm, and still more preferably greater than or equal to 0.3 µm and less than 1 µm. Further, in the base metal pigment according to the present embodiment, the average thickness thereof is preferably 1 nm to 100 nm, and more preferably 10 nm to 70 nm. When the average particle diameter and average thickness of the base metal pigment are respectively within the above ranges, in the case where this base metal pigment is applied to an aqueous ink composition, the flatness and smoothness of a coating film become excellent, and thus it is possible to record an image having excellent metallic luster. Furthermore, it is possible to manufacture a pigment dispersion liquid in a high production yield and to prevent the base metal pigment from being involuntarily deformed in the preparation of the aqueous ink composition.

This average particle diameter is represented by a 50% average particle diameter (R50) of circle-equivalent diameters obtained from the area of a projected image of the base metal pigment, in which the projected image is obtained by a particle image analyzer. The "circle-equivalent diameter" means the diameter of a circle when the circle is assumed to have the same area as the area of the projected image of the base metal pigment, in which the projected image is obtained using a particle image analyzer. For example, when the projected image of the base metal pigment has a polygonal shape, the diameter of this circle obtained by converting this projected image into a circle is referred to as the circle-equivalent diameter of this base metal pigment.

The area and circle-equivalent diameter of the projected image of the base metal pigment can be measured using a particle image analyzer. Examples of this particle image analyzer include flow-type particle image analyzers FPIA-2100, FPIA-3000, and FPIA-3000S (all are trade names, manufactured by Sysmex Corporation). The average particle diameter of the circle-equivalent diameter is a particle diameter based on number. As the measuring method using FPIA-3000 or FPIA-3000S, a measuring method operated in a HPF measurement mode using a high-power imaging unit is exemplified.

Meanwhile, the average thickness is obtained by photographing a lateral image of a base metal pigment using a transmission electron microscope (TEM) or a scanning electron microscope (SEM), respectively measuring the thicknesses of ten base metal pigments and then averaging these thicknesses. As the transmission electron microscope (TEM), "JEM-2000EX", manufactured by JEOL Ltd., is exemplified, and as the scanning electron microscope (SEM), "S-4700", manufactured by Hitachi High-Technologies Corporation, is exemplified.

2. Aqueous Base Metal Pigment Dispersion Liquid

The aqueous base metal pigment dispersion liquid according to the present embodiment includes: a base metal pigment surface-treated with a fluorine-based compound; and water as a part of a solvent, in which the aqueous base metal pigment dispersion liquid has a zeta potential of greater than or equal to −50 mV and less than or equal to −15 mV, as measured by an ultrasonic zeta potential measurement device, in a pH range of greater than or equal to 5 and less than or equal to 10.

That is, the aqueous base metal pigment dispersion liquid according to the present embodiment is a dispersion liquid in which the base metal pigment is dispersed in the aqueous medium. Accordingly, descriptions of the mother particle or fluorine-based compound constituting the base metal pigment and the shape, zeta potential, average particle diameter, average thickness, manufacturing method, aqueous medium, and additive of the base metal pigment will be omitted because they are the same as those of the above-mentioned base metal pigment.

In the aqueous base metal pigment dispersion liquid according to the present embodiment, the measured specific dielectric constant of the aqueous medium, from which the base metal pigment was removed by centrifugal separation, is preferably greater than or equal to 45 and less than or equal to 60, and more preferably greater than or equal to 50 and less than or equal to 58. When the aqueous medium having a specific dielectric constant within the above range is used as a dispersion medium, the water resistance and dispersion stability of the base metal pigment surface-treated with the fluorine-based compound become better.

3. Aqueous Ink Composition

The aqueous ink composition according to the present embodiment includes: a base metal pigment surface-treated with a fluorine-based compound; and water as a part of a solvent, in which the aqueous ink composition has a zeta potential of greater than or equal to −50 mV and less than or equal to −15 mV, as measured by an ultrasonic zeta potential measurement device, in a pH range of greater than or equal to 5 and less than or equal to 10.

Descriptions of the mother particle or fluorine-based compound constituting the base metal pigment and the shape, average particle diameter, average thickness, manufacturing method, aqueous medium, and additive of the base metal pigment will be omitted because they are the same as those of the above-mentioned base metal pigment.

The aqueous ink composition according to the present embodiment is an aqueous ink composition containing a base metal pigment having good water resistance and dispersion stability. In the aqueous ink composition according to the present embodiment, since the dispersion stability of the base metal pigment is excellent, the clogging of a nozzle due to the agglomeration of the base metal pigment particles is suppressed even when this aqueous ink composition is applied to an ink jet printer. For this reason, the discharge stability of ink becomes better. In addition, since surface free energy can be lowered by the effect of fluorine in the fluorine-based compound bonded to the surface of the base metal pigment, the base metal pigment is easily leafed at the time of drying ink, and it is possible to record an image having excellent metallic luster.

Furthermore, according to the aqueous ink composition according to the present embodiment, since the zeta potential of this aqueous ink composition in a wide pH range is a negative value, which is steady, it is possible to prevent problems, such as poor discharge due to agglomeration near a head nozzle hole, poor capping due to the agglomeration and precipitation of residues, gelation in the passage of waste liquid, accumulation of precipitate in a waste liquid bottle, and the like, even when this aqueous ink composition is mixed with a different aqueous ink in a head cap or a waste liquid tank.

In the aqueous ink composition according to the present embodiment, the measured specific dielectric constant of the aqueous medium, from which the base metal pigment was removed by centrifugal separation, is preferably greater than or equal to 45 and less than or equal to 60, and more preferably greater than or equal to 50 and less than or equal to 58. When the aqueous medium having a specific dielectric constant within the above range is used as a dispersion medium, the water resistance and dispersion stability of the base metal pigment surface-treated with the fluorine-based compound become better. In addition, when the aqueous medium is a mixed solvent, generally, the specific dielectric constant of the mixed solvent has a value close to the weighted average value of the specific dielectric constant of each solvent, but frequently, may have a value distant from the weighted average value thereof due to other factors such as interaction between solvents, and the like.

In the invention, the "aqueous ink composition" is referred to as an ink composition including water in an amount of more than or equal to 30 mass %, preferably more than or equal to 40 mass %, and more preferably more than or equal to 50 mass %, based on 100 mass % of the total amount of a solvent. It is preferred that pure water or ultrapure water such as ion-exchanged water, ultrafiltered water, reverse osmotic water, or distilled water be used as the water. In particular, water obtained by sterilizing the above-mentioned water by ultraviolet irradiation or by the addition of hydrogen peroxide is preferably used because it can suppress the generation of fungi or bacteria over a long period of time.

The concentration of the base metal pigment in the aqueous ink composition according to the present embodiment is preferably 0.1 mass % to 5.0 mass %, more preferably 0.25 mass % to 3.0 mass %, and particularly preferably 0.5 mass % to 2.5 mass %, based on the total mass of the aqueous ink composition.

If necessary, resins, a surfactant, alkanediol, polyhydric alcohol, a pH adjuster, or the like may be added to the aqueous ink composition according to the present embodiment.

Resins have a function of strongly attaching a base metal pigment onto a recording medium. Examples of the resins include homopolymers or copolymers of acrylic acid, acrylic acid esters, methacrylic acid, methacrylic acid ester, acrylonitrile, cyanoacrylate, acrylamide, olefin, styrene, vinyl acetate, vinyl chloride, vinyl alcohol, vinyl ether, vinyl pyrrolidone, vinyl pyridine, vinyl carbazole, vinyl imidazole, and vinylidene chloride; urethane resins; fluorine resins; and natural resins. As the copolymer, any one of a random copolymer, a block copolymer, an alternate copolymer, and a graft copolymer may be used.

It is preferable that the surfactant include an acetylene glycol-based surfactant, a polysiloxane-based surfactant, and a fluorine-based surfactant. These acetylene glycol-based surfactant, polysiloxane-based surfactant, and fluorine-based surfactant can increase the permeability of an ink by increasing the wettability into the recording surface of a recording medium. Examples of the acetylene glycol-based surfactant include 2,4,7,9-tetramethyl-5-desine-4,7-diol, 3,6-dimethyl-4-octine-3,6-diol, 3,5-dimethyl-1-hexyne-3-ol, and 2,4-dimethyl-5-hexyne-3-ol. Further, as the acetylene glycol-based surfactant, commercially available products thereof may be used, and examples thereof include OLFINE E1010, STG, and Y (all are trade names, manufactured by Nissin Chemical Co., Ltd.), Surfynol 104, 82, 465, 485, and TG (all are trade names, manufactured by Air Products and Chemicals, Inc.). As the polysiloxane-based surfactant, commercially available products thereof may be used, and examples thereof include BYK-347, and BYK-348 (all are trade names, manufactured by BYK Japan K.K.). Examples of the fluorine-based surfactant include Megafac F-430, Megafac F-444, Megafac F-472SF, Megafac F-475, Megafac F-477, Megafac F-552, Megafac F-553, Megafac F-554, Megafac F-555, Megafac F-556, Megafac F-558, Megafac R-94, Megafac RS-75, and Megafac RS-72-K (all are trade names, manufactured by DIC Corporation); EFTOP EF-351, EFTOP EF-352, EFTOP EF-601, EFTOP EF-801, and EFTOP EF-802 (all are trade names, manufactured by Mitsubishi Materials Corporation); FTERGENT 222F, FTERGENT 251, and FTX-218 (all are trade names, manufactured by Neos Co., Ltd.); and Surflon SC-101, and Surflon KH-40 (all are trade names, manufactured by AGC Seimi Chemical Co., Ltd.). Meanwhile, other surfactants, such as an anionic surfactant, a nonionic surfactant, and an amphoteric surfactant, may be added to the aqueous ink composition.

The alkanediol can increase the permeability of an ink by increasing the wettability into the recording surface of a recording medium. Preferably, the alkanediol is 1,2-alkanediol having a carbon number of greater than or equal to 4 and less than or equal to 8, such as 1,2-butanediol, 1,2-pentanediol, 1,2-hexanediol, 1,2-heptanediol, 1,2-octanediol, or the like. Among these, 1,2-hexanediol, 1,2-heptanediol, and 1,2-octanediol, each having a carbon number of greater than or equal to 6 and less than or equal to 8, are more preferable because their permeability into a recording medium is very high.

The polyhydric alcohol can suppress the drying of an aqueous ink composition when the aqueous ink composition is applied to an ink jet recording apparatus, thereby preventing the clogging of the aqueous ink composition in a head portion of the ink jet recording apparatus. Examples of the polyhydric alcohol include ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylol ethane, and trimethylol propane.

Examples of the pH adjuster include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, and sodium hydrogen carbonate.

The aqueous ink composition according to the present embodiment may further contain additives, such as a fixing agent of water-soluble rosin or the like, an antifungal agent or antiseptic agent of sodium benzoate or the like, an antioxidant or ultraviolet absorber of allophanates or the like, a chelating agent, and an oxygen absorber. These additives may be used alone or in a combination of two or more thereof.

Meanwhile, it is preferable that the aqueous ink composition according to the present embodiment not substantially contain a polymerizable compound. The sentence "a polymerizable compound is not substantially contained" means that the polymerizable compound is not intentionally added to the aqueous ink composition, and that the polymerizable compound may be contained such that it is previously contained in the additive added at the time of adjusting the aqueous ink composition. Accordingly, there is a case that the metallic luster of a recorded image becomes better. In contrast, when the aqueous ink composition contains a polymerizable compound, there are problems that the stability (preservation stability) of the composition becomes inferior, and the discharge stability of the composition is deteriorated due to a viscosity increase attributable to gelation.

This polymerizable compound includes a radical polymerizable compound and a cationic polymerizable compound. Examples of the radical polymerizable compound include an allyl compound, and more preferably an allyl ether compound, ethylene glycol monoallyl ether, trimethylolpropane diallyl ether, trimethylolpropane monoallyl ether, glycerin monoallyl ether, allyl glycidyl ether, pentaerythritol triallyl ether, (meth)acrylic acid, a (meth)acrylic acid compound, and a vinyl compound. Examples of the cationic polymerizable compound include an epoxy compound, a vinyl ether compound, and an oxetane compound, which are disclosed in JP-A-6-9714, JP-A-2001-310937, and JP-A-2001-220526, respectively.

The aqueous ink composition according to the present embodiment, the use thereof not being particularly limited, can be applied to writing materials, stamps, recorders, pen plotters, ink jet recording apparatuses, and the like.

The viscosity of the aqueous ink composition according to the present embodiment at 20° C. is preferably greater than or equal to 2 mPa·s and less than or equal to 10 mPa·s, more preferably greater than or equal to 3 mPa·s and less than or equal to 5 mPa·s. When the viscosity of the aqueous ink composition at 20° C. is within the above range, the aqueous ink composition is discharged from a nozzle in an adequate amount, and the curved flight and scattering of the aqueous ink composition can be further suppressed, and therefore this aqueous ink composition can be suitably used in an ink jet recording apparatus.

4. Examples

Hereinafter, the invention will be described in detail based on the following Examples, but is not limited to these Examples. The "part" and "%" in Examples and Comparative Examples are mass standards unless otherwise specified.

4.1. Example 1

4.1.1. Preparation of Aluminum Particle Dispersion Liquid

First, a polyethylene terephthalate-made film having a flat and smooth surface (surface roughness Ra: less than or equal to 0.02 μm) was prepared.

Subsequently, the entire one side of this film is coated with silicone oil. A film made of aluminum (hereinafter, simply referred to as "an aluminum film") was formed on the surface side coated with this silicone oil using an evaporation method.

Subsequently, the film provided with the aluminum film was immersed in diethylene glycol diethyl ether, and was irradiated with ultrasonic waves to strip and pulverize the aluminum film from the film. Subsequently, this aluminum film was put into a homogenizer, and was pulverized for about 8 hours to obtain a dispersion liquid of scale-like aluminum particles (mother particles). The concentration of aluminum particles in this dispersion liquid was 10 mass %.

Subsequently, 100 parts by mass of diethylene glycol diethyl ether was added to 100 parts by mass of the dispersion liquid containing the aluminum particles obtained in this way to adjust the concentration of aluminum particles to 5 mass %, and then 50 parts by mass of 2-(perfluorohexyl) ethylphosphonic acid was added to 100 parts by mass of the aluminum particles, and these aluminum particles were surface-treated while performing ultrasonic irradiation at a liquid temperature of 55° C. for 3 hours. Thereafter, the surface-treated aluminum particles were centrifugally precipitated by a centrifugal separator (10000 rpm×30 min), its supernatant portion was discarded, an aqueous propylene glycol solution added with a fluorine-based surfactant (trade name "Megafac F-553", manufactured by DIC Corporation) was added thereto to re-disperse the aluminum particles, and then the re-dispersed aluminum particles were heat-treated at 70° C. for 6 days. Subsequently, these aluminum particles were centrifugally precipitated by a centrifugal separator (10000 rpm×30 min), its supernatant portion was discarded, an aqueous 2-methyl-2,4-pentanediol solution was added thereto, and then ultrasonic irradiation was conducted, thereby cleaning the aluminum particles. In this way, surface-treated aluminum particles were obtained. The average particle diameter of the obtained aluminum particles was 0.8 μm, and the average thickness thereof was 10 nm. In Table, the aluminum particle dispersion liquid obtained in this way is expressed as "dispersion liquid 1".

4.1.2. Preparation of Aqueous Ink Composition

In the above cleaned aluminum particle dispersion liquid, aluminum particles were centrifugally precipitated by a centrifugal separator (10000 rpm×30 min), an aqueous medium mixed with components other than the aluminum particles given in Table was added thereto such that the concentration of aluminum particles was 1.2 mass %, and ultrasonic irradiation was conducted, thereby obtaining an aqueous ink composition given in Table.

4.1.3. Measurements of Zeta Potential and Specific Dielectric Constant

Measurement of Zeta Potential

The zeta potential of the above obtained aqueous ink composition in a pH range of 4 to 12 was measured using an ultrasonic zeta potential measurement device (device name "DT-1200", manufactured by Dispersion Technology Inc.). Specific measurement method is as follows.

As the procedure of measurement, first, the ion current of the ink (ink water) except for aluminum pigment was measured. Specifically, the measurement of the ion current was conducted using DT-1200 at a measuring temperature of 25° C. by inputting the specific dielectric constant of the ink water measured by the following method and the static viscosity at 25° C. to a measurement device. Thereafter, the ion current of an ink composition was measured using DT-1200 at the same measuring temperature of 25° C. Parameters that have been input to the measurement device include specific dielectric constant of ink water measured by the following method, static viscosity of ink water at 25° C., solute data (this time: Al), and average particle diameter of pigment (this time: 0.8 μm). As the pH adjuster of both the ink water and the ink composition, sodium hydroxide (NaOH) was used. Finally, the difference in ion current between the ink composition and the ink water was calculated to obtain the zeta potential of the pigment. The reason for calculating the difference is that a dispersing agent contained in the ink composition removes the current value (noise) derived from a pH adjuster.

Measurement of Specific Dielectric Constant

In the above obtained aqueous ink composition, aluminum particles were centrifugally precipitated by a centrifugal separator (3000 rpm×10 min) to obtain a supernatant solution, and this supernatant solution was used as a sample. The specific dielectric constant of the sample was measured at 23° C. by a parallel-plate capacitor method using an alternate current-type dielectric constant measurement device (device name "ARES-K2", manufactured by TA Instruments Japan, Inc.). Specifically, under an environment of 23° C., the sample was pinched between two parallelly-arranged electrode plates (stainless plate having a diameter of 25 mm φ) (gap between electrode plates: 0.5 mm) to form a capacitor, and then an alternate current of 1 V was applied to the capacitor at a frequency of 10 kHz to 100 kHz to measure the specific dielectric constant thereof, thereby obtaining the specific dielectric constant at the time of applying the alternate current at a frequency of 10 kHz. The results of measurement of specific dielectric constants are given in Table.

4.1.4. Evaluation Test

Dispersion Stability Evaluation Test

Dispersion stability was evaluated depending on how much the above obtained aqueous ink composition passes through a 10 μm filter (MITEX MEMBRANE FILTERS (model number: LCWPO4700), manufactured by MILIPORE Corporation). Evaluation criteria of dispersion stability are as follows. The results of dispersion stability evaluation test are given in Table.
A: Filter passing amount is more than or equal to 100 cc.
B: Filter passing amount is more than or equal to 10 cc and less than 100 cc.
C: Filter passing amount is more than or equal to 5 cc and less than 10 cc.
D: Filter passing amount is more than or equal to 1 cc and less than 5 cc.
E: Filter passing amount is less than 1 cc.
Water Resistance Evaluation Test 10 cc of the above obtained aqueous ink composition was hermetically contained in an aluminum pack. This aluminum pack was stored at a constant temperature of 70° C. for 6 days. Gas yield after the storage was measured by Archimedes' method. Further, the appearance of the dispersion liquid after storage at 70° C. for 6 days was visually observed. Evaluation criteria of water resistance are as follows. The results of water resistance evaluation test are given in Table.
A: Gas yield is less than 0.5 cc/g (dispersion liquid), and appearance does not change.
B: Gas yield is more than or equal to 0.5 cc/g (dispersion liquid) and less than 1 cc/g (dispersion liquid), and appearance does not change.
C: Gas yield is more than or equal to 1 cc/g (dispersion liquid), and whitening caused by the formation of Al(OH)$_3$ occurs.

4.2. Examples 2 and 3

The aqueous ink compositions of Examples 2 and 3 were prepared and the measurement and evaluation thereof were conducted in the same manner as Example 1, except that the aqueous medium to be added at the time of preparing the aqueous ink composition was changed to those given in Table. The results thereof are given in Table.

4.3. Comparative Example 1

The aluminum particle dispersion liquid of Comparative Example 1 was prepared in the same manner as Example 1, except that the heat treatment (aqueous propylene glycol solution) after centrifugal separation and the cleaning (aqueous 2-methyl-2,4-pentanediol solution) after centrifugal separation were not conducted at the time of preparing an aluminum particle dispersion liquid. Further, the aqueous ink composition of Comparative Example 1 was prepared and the measurement and evaluation thereof were conducted in the same manner as Example 1, except that the aqueous medium to be added at the time of preparing the aqueous ink composition was changed to those given in Table. The results thereof are given in Table.

4.4. Comparative Example 2

The aluminum particle dispersion liquid of Comparative Example 2 was prepared in the same manner as Example 1, except that heat treatment was not conducted at the time of preparing an aluminum particle dispersion liquid. Further, the aqueous ink composition of Comparative Example was prepared and the measurement and evaluation thereof were conducted in the same manner as Example 1, except that the aqueous medium to be added at the time of preparing the aqueous ink composition was changed to those given in Table. The results thereof are given in Table.

4.5. Comparative Example 3

4.5.1. Preparation of Aluminum Particle Dispersion Liquid

Mother particles, which are the same as those of Example 1, were used. That is, a dispersion liquid containing scale-like aluminum particles (mother particles) in a composition ratio of 10 mass % was used.

Subsequently, 100 parts by mass of this aluminum particle dispersion liquid was put into a beaker, and 10.4 parts by mass of tetraethoxysilane (TEOS) and 2 parts by mass of aqueous ammonia of 1 mol/L, as a basic catalyst, were added thereto, and then the resultant was hydrolytically condensed with stirring at room temperature for 7 days. In this way, a dispersion liquid containing aluminum particles having a silica film formed on the surface thereof was obtained. In Table, the aluminum particle dispersion liquid obtained in this way is expressed as "dispersion liquid 2".

4.5.2. Preparation of Aqueous Ink Composition

Subsequently, this aluminum particle dispersion liquid containing aluminum particles having a silica film formed on the surface thereof was centrifugally separated (10,000 rpm, 60 min) to remove diethylene glycol diethyl ether (supernatant liquid). Then, an aqueous medium mixed with components other than the aluminum particles given in Table was added thereto such that the concentration of aluminum particles was 1.2 mass %, and ultrasonic irradiation was conducted, thereby obtaining an aqueous ink composition given in Table.

4.5.3. Measurement and Evaluation

The measurement of zeta potential and dielectric constant and the evaluation of dispersion stability and water resistance were conducted in the same manner as Example 1.

4.6. Comparative Example 4

Further, an aqueous ink composition of Comparative Example 4 was prepared and the measurement and evaluation thereof were conducted in the same manner as Comparative Example 3, except that the aqueous medium to be added at the time of preparing an aqueous ink composition was changed to those given in Table. The results thereof are given in Table.

4.7. Evaluation Result

Table shows the components of the aqueous ink compositions used in Examples 1 to 3 and Comparative Examples 1 to 4 and the results of measurement and evaluation thereof. In Table, the numerical value listed in the column of each component indicates "mass %", and the symbol "-" listed therein indicates non-addition. Further, in Table, a graph representing the relationship between pH and zeta potential in Example 1 to 3 and Comparative Examples 1 to 4 is shown.

TABLE

| Components of aqueous ink composition | | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|---|
| Kind of dispersion liquid | | 1 | 1 | 1 | 1 | 1 | 2 | 2 |
| Aluminum particle | | 1.2 | 1.2 | 1.2 | 1.2 | 1.2 | 1.2 | 1.2 |
| Propylene glycol | | 35 | 35 | 21 | 4 | 21 | 50 | 50 |
| 2-pyrrolidone | | — | — | 9 | — | — | — | — |
| Hexylene glycol | | 15 | — | 9 | 4 | — | — | — |
| 1,2-hexanediol | | — | — | — | — | 3 | — | — |
| Triethylene glycol | | — | 15 | — | — | — | — | — |
| Megafac F-553 | | 0.35 | 0.35 | 0.35 | 0.35 | 0.35 | 0.35 | — |
| BYK-2012 | | — | — | — | — | — | — | 1.6 |
| Triethanolamine | | 0.15 | 0.15 | 0.015 | 0.15 | 0.15 | 0.15 | 0.15 |
| Water | | 48.3 | 48.3 | 59.435 | 90.3 | 74.3 | 47.05 | 47.05 |
| Specific dielectric constant | | 50.97 | 52.72 | 56.74 | 70.12 | 65.23 | 54.1 | 53.9 |
| Dispersion stability | | A | A | A | D | A | C | C |
| Water resistance | | A | A | A | C | C | B | B |
| | pH | | | | | | | |
| Zeta potential (mV) | 3.99 | −32.6 | −30.8 | −27.4 | −25.9 | −11.7 | 5.8 | 7.2 |
| | 4.99 | −30.4 | −29.4 | −26.5 | −17.5 | −11.4 | 4.2 | 5.9 |
| | 5.94 | −27.2 | −26.3 | −23.7 | −13.6 | −20.5 | 1 | 2.7 |
| | 6.98 | −25.6 | −24.8 | −22.3 | −12.2 | −25.5 | −6.2 | −4.2 |
| | 7.93 | −24.0 | −23.2 | −20.9 | −10.9 | −35.3 | −11.1 | −8.9 |
| | 9.65 | −23.3 | −22.6 | −20.3 | −10.2 | −35.4 | −10.5 | −9.5 |
| | 9.89 | −22.8 | −22.1 | −19.4 | −9.2 | −33.7 | −10 | −8.9 |
| | 10.98 | −19.9 | −19.3 | −18.4 | −7.2 | −29.4 | −4 | −3.8 |
| | 12.08 | 2.7 | 2.6 | 2.4 | 12.4 | −3.5 | 2.9 | 3.8 |

In Table, "Megafac F-553" is a trade name of a fluorine-based surfactant, manufactured by DIC Corporation. Further, "BYK-2012" is a dispersing agent of an acrylic copolymer solution, manufactured by BYK Japan K.K., and its trade name is "DISPERBYK-2012".

Referring to the evaluation results in Table and FIGURE, it was determined that, in the aqueous ink compositions of Examples 1 to 3, each of the zeta potential values thereof being greater than or equal to −50 mV and less than or equal to −15 mV in a pH range of greater than or equal to 5 and less than or equal to 10, the dispersion stability of aluminum particles surface-treated with a fluorine-based compound becomes better. Further, it was determined that, in the aqueous ink compositions of Examples 1 to 3, water resistance also becomes better.

Meanwhile, it was determined that, in the aqueous ink compositions of Comparative Examples 1 and 2, each being presumed that a fluorine-based compound is not strongly bonded to the surface of aluminum particles, a region in which the value of a zeta potential in a pH range of greater than or equal to 5 and less than or equal to 10 is greater than −15 mV exists, and thus dispersion stability is worsened.

In addition, it was determined that, in the aqueous ink compositions of Comparative Examples 3 and 4, each having a silica film formed on the surface of aluminum particles, the value of a zeta potential in a pH range of greater than or equal to 5 and less than or equal to 10 becomes greater than −15 mV, and thus dispersion stability is worsened.

The invention can be variously modified without being limited to the above-mentioned embodiments. For example, the invention includes substantially the same configurations as those described in the embodiments (for example, configurations having the same function, method, and result or configurations having the same object and effect). The invention includes configurations that replace non-essential parts of the configurations described in the embodiments. The invention includes configurations that can achieve the same action and effect as those described in the embodiments or the same purpose as the configurations described in the embodiments. The invention includes configurations obtained by applying known technologies to the configurations described in the embodiments.

The entire disclosure of Japanese Patent Application No. 2014-012381, filed Jan. 27, 2014 is expressly incorporated by reference herein.

What is claimed is:

1. A base metal pigment, which is used for an aqueous ink composition containing water as a part of a solvent,
    wherein the base metal pigment is surface-treated with a fluorine-based compound selected from the group of fluorine-based phosphonic acid, fluorine-based carboxylic acid, fluorine-based sulfonic acid, and salts thereof, and has a zeta potential of greater than or equal to −50 mV and less than or equal to −15 mV, as measured by an ultrasonic zeta potential measurement device, in a pH range of greater than or equal to 5 and less than or equal to 10.

2. The base metal pigment according to claim 1,
    wherein the difference between the maximum value and minimum value of the zeta potential in a pH range of greater than or equal to 5 and less than or equal to 10 is less than or equal to 15 mV.

3. The base metal pigment according to claim 1,
    wherein the base metal pigment has a scale-like shape.

4. The base metal pigment according to claim 1,
    wherein the fluorine-based compound has a perfluoroalkyl group.

5. The base metal pigment according to claim 4,
    wherein the perfluoroalkyl group has a carbon number of 1 to 6.

6. The base metal pigment according to claim 1,
    wherein heat treatment is performed when the base metal pigment is surface-treated with the fluorine-based compound.

7. An aqueous base metal pigment dispersion liquid, comprising:
    a base metal pigment surface-treated with a fluorine-based compound selected from the group of fluorine-based phosphonic acid, fluorine-based carboxylic acid, fluorine-based sulfonic acid, and salts thereof; and water as a part of a solvent, wherein the aqueous base metal pigment dispersion liquid has a zeta potential of greater than or equal to −50 mV and less than or equal to −15 mV, as measured by an ultrasonic zeta potential measurement device, in a pH range of greater than or equal to 5 and less than or equal to 10.

8. The aqueous base metal pigment dispersion liquid according to claim 7, wherein a solvent, from which the base metal pigment was removed by centrifugal separation, has a specific dielectric constant of greater than or equal to 45 and less than or equal to 60, as measured by an alternate current-type dielectric constant measurement device, at a temperature of 23° C. and a frequency of 10 kHz.

9. An aqueous ink composition, comprising:

a base metal pigment surface-treated with a fluorine-based compound selected from the group of fluorine-based phosphonic acid, fluorine-based carboxylic acid, fluorine-based sulfonic acid, and salts thereof; and water as a part of a solvent, wherein the aqueous ink composition has a zeta potential of greater than or equal to −50 mV and less than or equal to −15 mV, as measured by an ultrasonic zeta potential measurement device, in a pH range of greater than or equal to 5 and less than or equal to 10.

10. The aqueous ink composition according to claim 9, wherein a solvent, from which the base metal pigment was removed by centrifugal separation, has a specific dielectric constant of greater than or equal to 45 and less than or equal to 60, as measured by an alternate current-type dielectric constant measurement device, at a temperature of 23° C. and a frequency of 10 kHz.

* * * * *